US012638685B2

(12) United States Patent　　　(10) Patent No.: US 12,638,685 B2
Danziger et al.　　　　　　　　　　(45) Date of Patent: May 26, 2026

(54) OPTICAL SYSTEM FOR INDEPENDENT CONJUGATE IMAGE GENERATION

(71) Applicant: Lumus Ltd., Ness Ziona (IL)

(72) Inventors: Yochay Danziger, Kfar Vradim (IL); Eitan Ronen, Rechovot (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 19/170,118

(22) Filed: Apr. 4, 2025

(65) Prior Publication Data

US 2025/0231410 A1　　Jul. 17, 2025

Related U.S. Application Data

(63) Continuation of application No. 18/294,851, filed as application No. PCT/IB2022/058271 on Sep. 2, 2022, now Pat. No. 12,271,000.

(60) Provisional application No. 63/245,869, filed on Sep. 19, 2021, provisional application No. 63/240,951, filed on Sep. 5, 2021.

(51) Int. Cl.
　　*G02B 27/01*　　　(2006.01)
　　*G02B 27/18*　　　(2006.01)
　　*G02B 27/28*　　　(2006.01)

(52) U.S. Cl.
　　CPC ......... *G02B 27/0172* (2013.01); *G02B 27/18* (2013.01); *G02B 27/283* (2013.01); *G02B 2027/0178* (2013.01)

(58) Field of Classification Search
　　CPC .. G02B 27/0172; G02B 27/18; G02B 27/283; G02B 2027/0178
　　See application file for complete search history.

(56) References Cited

U.S. PATENT DOCUMENTS

| | | | |
|---|---|---|---|
| 9,551,880 B2 | 1/2017 | Amitai | |
| 10,564,417 B2 | 2/2020 | Danziger | |
| 10,969,590 B1 * | 4/2021 | Danziger | ............. H04N 9/3161 |
| 2008/0198471 A1 * | 8/2008 | Amitai | ................. G02B 27/285 359/630 |
| 2018/0210202 A1 | 7/2018 | Danziger | |

(Continued)

FOREIGN PATENT DOCUMENTS

| | | |
|---|---|---|
| WO | 2005/024491 A1 | 3/2005 |
| WO | 2016/103251 A1 | 6/2016 |

(Continued)

OTHER PUBLICATIONS

International Search Report and Written Opinion for corresponding International Patent Application No. PCT/IB2022/058271, mailed Dec. 23, 2022.

*Primary Examiner* — David D Davis
(74) *Attorney, Agent, or Firm* — Renner, Otto, Boisselle & Sklar, LLP

(57) ABSTRACT

An optical system includes (a) a light-guide optical element (LOE) and (b) an image projector. The LOE is formed from transparent material and has at least first and second mutually-parallel major external surfaces for supporting propagation of an image by internal reflection at the first and second major external surfaces. The LOE includes a coupling-out arrangement for coupling out the image towards an eye of the user and a coupling-in arrangement. The image projector includes an image generator for generating an image and an image conjugate generator for generating a conjugate image.

14 Claims, 15 Drawing Sheets

(56)                   References Cited

U.S. PATENT DOCUMENTS

2020/0183159  A1      6/2020   Danziger
2020/0200963  A1*    6/2020   Eisenfeld ............. G02B 6/0061
2020/0209667  A1      7/2020   Sharlin et al.
2020/0249481  A1*    8/2020   Danziger ........... G02B 27/0172
2021/0072553  A1      3/2021   Danziger et al.
2021/0080637  A1*    3/2021   Brick ................. G02B 27/0172
2024/0337844  A1*   10/2024   Danziger ............... G02B 27/18

FOREIGN PATENT DOCUMENTS

WO           2020/183229  A1     9/2020
WO      WO-2021001841  A1 *   1/2021    ............. G02B 27/14

* cited by examiner

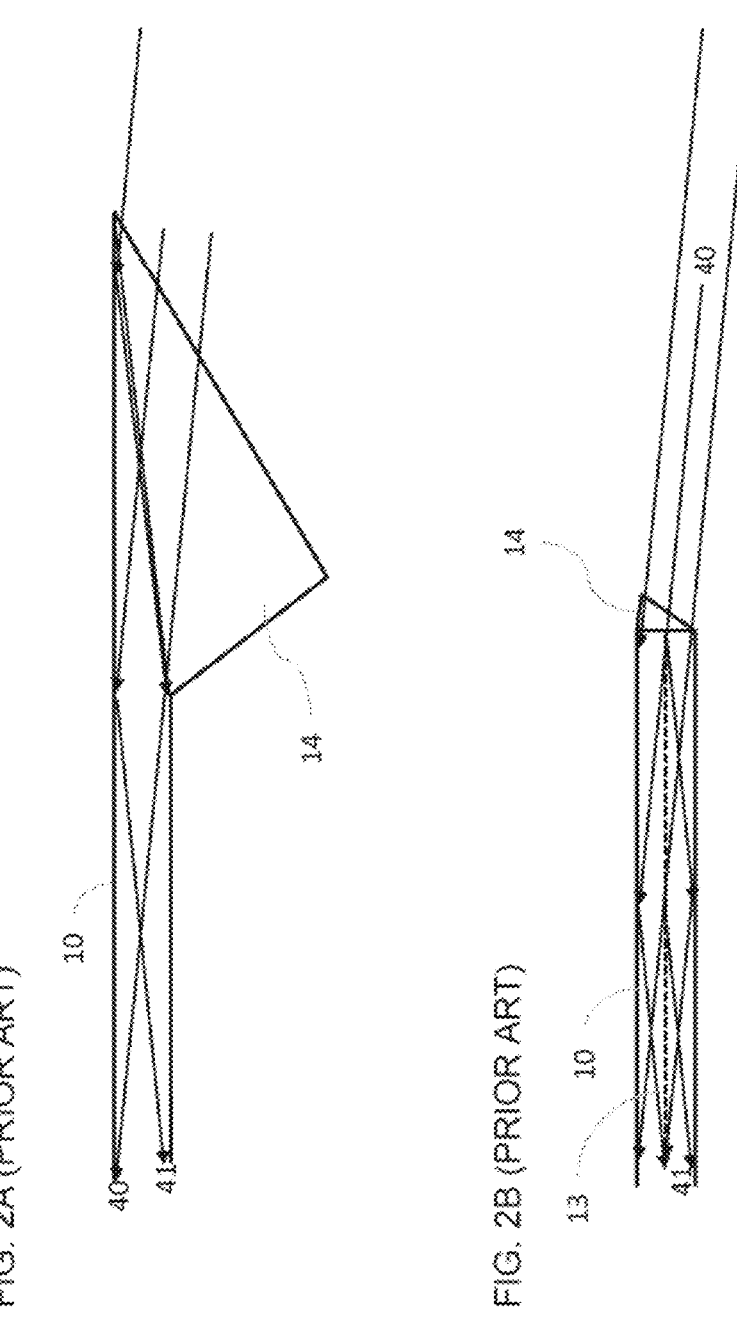

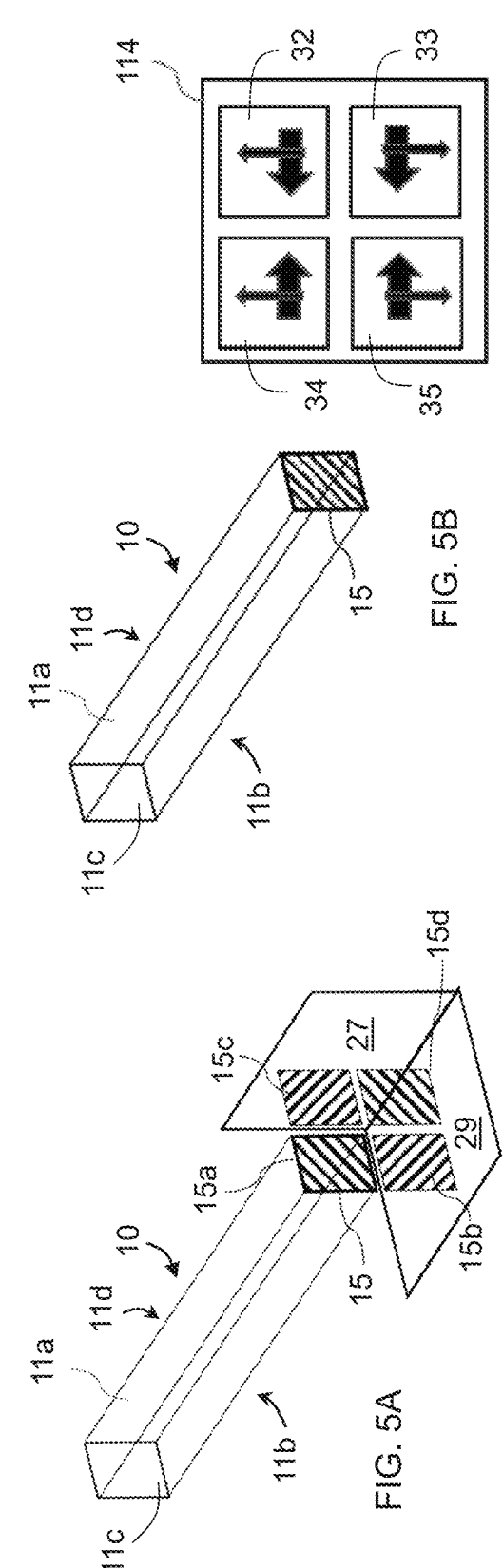

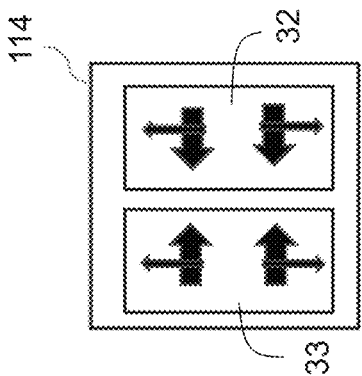
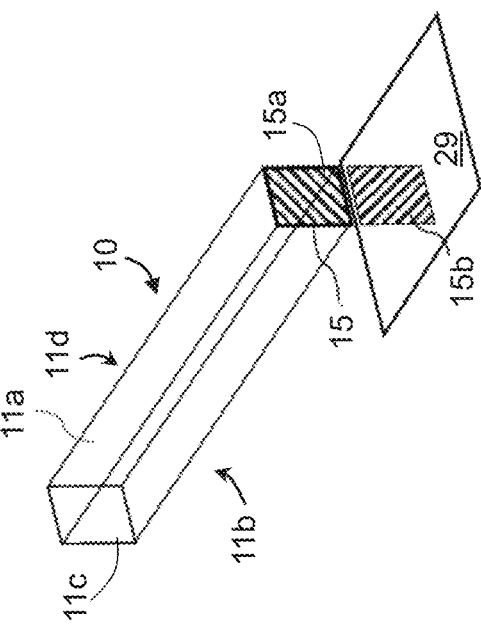
FIG. 6

OPTICAL SYSTEM FOR INDEPENDENT CONJUGATE IMAGE GENERATION

This application a continuation and claims priority to U.S. application Ser. No. 18/294,851, filed Feb. 2, 2024, which claims priority to International Application No. PCT/IB2022/058271, filed Sep. 2, 2022, which claims priority to U.S. Provisional Patent Application No. 63/245,869, filed Sep. 19, 2021, and U.S. Provisional Patent Application No. 63/240,951, filed Sep. 5, 2021, each of which is hereby incorporated herein by reference in its entirety.

FIELD OF THE INVENTION

The present invention relates to optical systems and, in particular, it concerns an optical system for displaying an image to a user.

BACKGROUND OF THE INVENTION

Various types of displays, and particularly near-eye displays (NED), typically employ one or more waveguides in which an image is injected from an image projector so as to propagate within the waveguide by total internal reflection (TIR) and is subsequently coupled out towards an observer's eye via one or more coupling-out elements (e.g., partially-reflecting internal surfaces ("facets"), a diffraction grating, etc.). Such waveguides are made of a transparent substrate having a pair of parallel major external surfaces extending along the length of the waveguide between which the image and its conjugate are reflected. The image is preferably a collimated image, and the waveguide is preferably planar. For best performance, both the image and its conjugate should completely fill the waveguide, so that illumination corresponding to each pixel of the image and each pixel of the conjugate image is present at every point within the thickness of the waveguide (for areas of the waveguide that contribute to the output image that can reach the eye of the user).

Filling of the waveguide can be achieved by providing a coupling-in prism with a coupling-in surface which is oriented roughly perpendicular to the chief ray of the injected image, allowing the image to fall on an extended region of one surface of the waveguide so as to generate the conjugate image. However, particularly for implementations with images injected at relatively shallow-angles relative to the major external surfaces (i.e., close to 90 degrees to the normal of the surface), the length of the coupling-in region required to fill the waveguide with the conjugate image adds significantly to the dimensions of the waveguide. This is illustrated in FIG. 2A which illustrates a typical coupling-in to a waveguide 10. A coupling-in prism 14 cut from the waveguide substrate or attached thereto is used to direct rays 40, 41 into the waveguide at shallow angles. As rays 40, 41 propagate within the waveguide, ray 41 is reflected off the top surface of the waveguide thereby becoming the conjugate of ray 40. As is apparent from FIG. 2A, even with the coupling-in prism, a relatively large input aperture (and consequently larger projector) is required in order to produce the conjugates of shallow rays within the waveguide. An alternative approach for filling the waveguide illustrated in FIG. 2B employs a 50% beam splitter (or "mixer") 13 internally in the waveguide 10 at about the midpoint subdividing the thickness of the waveguide 10 between the major external surfaces and extending at least part of the way along the length of the waveguide parallel to the external surfaces. The beam splitter 13 is effective to partially reflect rays to generate the conjugates thereof (e.g., ray 41) within the waveguide 10 and allows for a smaller input aperture and wedge prism 14 (compare to FIG. 2A).

Although the presence of mixer 13 allows use of a smaller projector aperture and coupling prism, the mixer itself adds significantly to the dimensions of the waveguide. The minimal length required of mixer 13 can be expressed by the equation $1_{min}=\omega \cdot \tan(\phi)$, where $\omega$ is the width of the waveguide and $\phi$ is propagation of the angle of field (relative to the normal of the LOE major surfaces). Thus, the above constraints on the minimal length of the mixer requires making the waveguide longer to accommodate the mixer. Additionally, the incorporation of the mixer inside the waveguide requires greater accuracy in the production of the waveguide due to the required parallelism with the waveguide surfaces.

SUMMARY OF THE INVENTION

According to the teachings of an embodiment of the present invention there is provided, an optical system which may include (a) a light-guide optical element (LOE) formed from transparent material and having at least first and second mutually-parallel major external surfaces for supporting propagation of an image by internal reflection at the first and second major external surfaces. The LOE may have a coupling-out arrangement for coupling out the image towards an eye of the user. The LOE may also have a coupling-in arrangement. The optical system may further include an image projector comprising an image generator for generating an image and an image conjugate generator for generating a conjugate image. The image generator and the image conjugate generator may be disposed such as to project the image and the conjugate image, respectively, from directions not directly in front of the LOE.

According to the teachings of another-embodiment of the present invention there is provided, an optical system for directing an image towards a user for viewing. The optical system comprises: (a) a light-guide optical element (LOE) formed from transparent material and having at least first and second mutually-parallel major external surfaces for supporting propagation of an image by internal reflection at the first and second major external surfaces. The LOE may have a coupling-out arrangement for coupling out the image towards an eye of the user. The LOE may also have a coupling-in arrangement. The optical system may further include an image projector comprising an image generator configured to sequentially generate an image and a conjugate image of the image. The image projector may be coupled to the coupling-in arrangement so as to introduce into the coupling-in arrangement the image and its conjugate image prior to the image and the conjugate image impinging on either of the at least first and second major external surfaces. The image generator may be disposed such as to project the image and the conjugate image from directions not directly in front of the LOE.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

BRIEF DESCRIPTION OF THE DRAWINGS

FIG. 2A, described above, is a schematic side view illustrating conventional coupling-in of an image into an LOE via a coupling prism;

FIG. 2B, described above, is a schematic side view illustrating conventional coupling-in of an image into an LOE having an integrated beam multiplier;

FIGS. 4A and 4B illustrate a one dimensional LOE having only two reflecting surfaces;

FIGS. 5A and 5B illustrate a two dimensional LOE having four reflecting surfaces;

FIG. 6 illustrates a two dimensional LOE having four reflecting surfaces in a hybrid arrangement;

DETAILED DESCRIPTION

Certain embodiments of the present invention provide an optical system including a light-guide optical element (LOE) for achieving optical aperture expansion for the purpose of a head-up display, and most preferably a near-eye display, which may be a virtual reality display, or more preferably an augmented reality display.

Figures 1A, 1B:
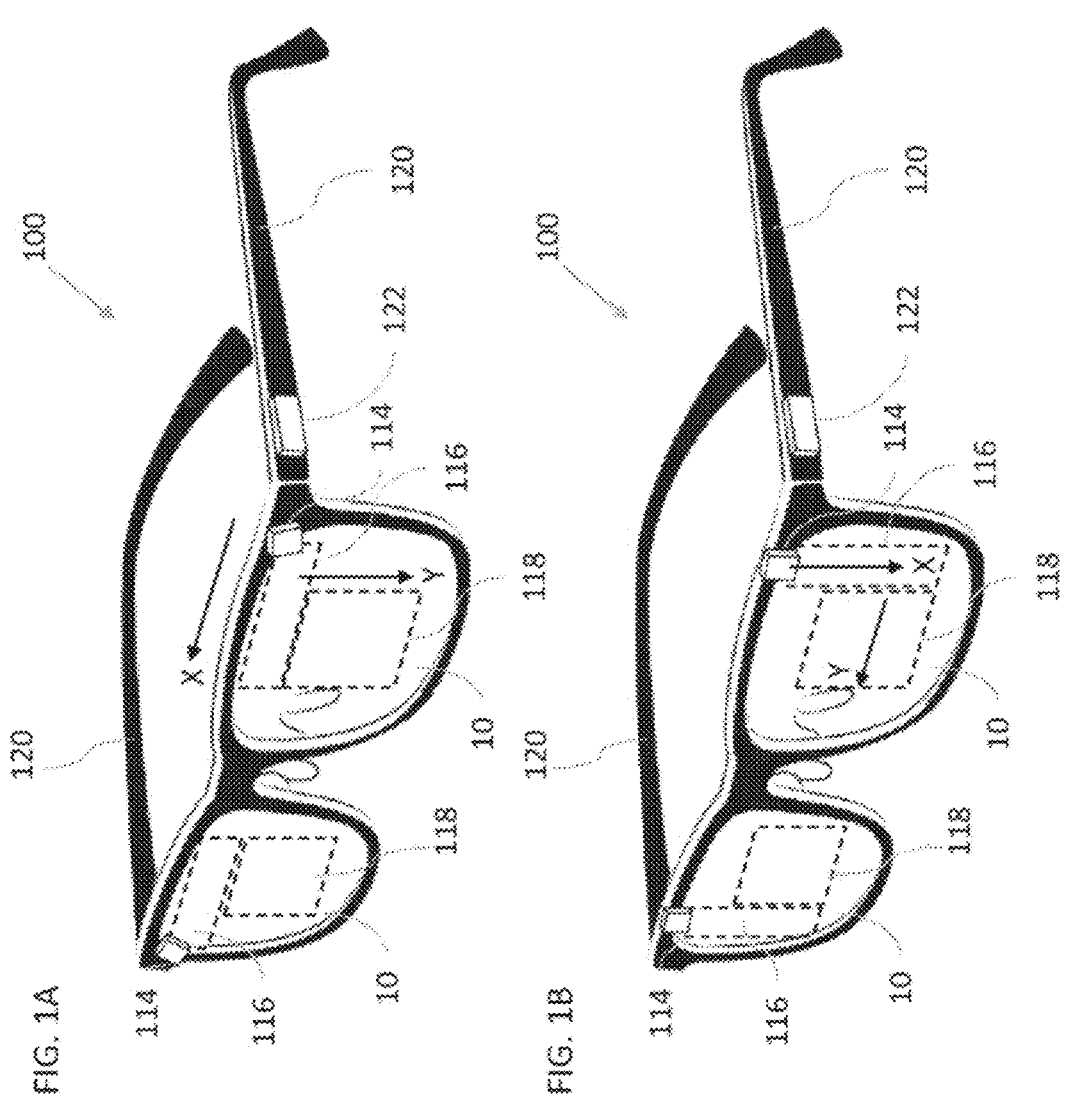
FIGS. 1A and 1B are schematic isometric views of an optical system, constructed and operative according to the teachings of the present invention, implemented using a light-guide optical element (LOE), illustrating a top-down and a side-injection configuration, respectively.

An exemplary implementation of a device in the form of a near-eye display according to the teachings of an embodiment of the present invention, generally designated 100, employing an LOE 10, is illustrated schematically in FIGS. 1A and 1B. The near-eye display 100 employs a compact image projector (or "POD") 114 optically coupled so as to inject an image into LOE (interchangeably referred to as a "waveguide," a "substrate" or a "slab") 10 within which the image light is trapped in one dimension by internal reflection at a set of mutually-parallel planar external surfaces.

Optical aperture expansion is achieved within LOE 10 by one or more arrangement for progressively redirecting the image illumination, typically employing a set of partially-reflecting surfaces (interchangeably referred to as "facets") that are parallel to each other and inclined obliquely to the direction of propagation of the image light, with each successive facet deflecting a proportion of the image light into a deflected direction. For one-dimensional aperture expansion, the facets also couple-out the image light towards the eye of the user. In some cases, as illustrated here, two-dimensional aperture expansion is achieved by employing a first set of facets in region 116 to progressively redirect the image illumination within the LOE, also trapped/guided by internal reflection. The deflected image illumination then passes into a second substrate region 118, which may be implemented as an adjacent distinct substrate or as a continuation of a single substrate, in which a coupling-out arrangement (for example, a further set of partially reflective facets) progressively couples out a proportion of the image illumination towards the eye of an observer located within a region defined as the eye-motion box (EMB), thereby achieving a second dimension of optical aperture expansion. Similar functionality may be obtained using diffractive optical elements (DOEs) for redirecting and/or coupling-out of image illumination within one or both of regions 116 and 118.

The overall device may be implemented separately for each eye and is preferably supported relative to the head of a user with the each LOE 10 facing a corresponding eye of the user. In one particularly preferred option as illustrated here, a support arrangement is implemented as an eye glasses frame with sides 120 for supporting the device relative to ears of the user. Other forms of support arrangement may also be used, including but not limited to, head bands, visors or devices suspended from helmets.

Reference is made herein in the drawings and claims to an X axis which extends horizontally (FIG. 1A) or vertically (FIG. 1B), in the general extensional direction of the first region of the LOE, and a Y axis which extends perpendicular thereto, i.e., vertically in FIG. 1A and horizontally in FIG. 1B. In very approximate terms, the first LOE, or first region 116 of LOE 10, may be considered to achieve aperture expansion in the X direction while the second LOE, or second region 118 of LOE 10, achieves aperture expansion in the Y direction. The details of the spread of angular directions in which different parts of the field of view propagate will be addressed more precisely below. It should be noted that the orientation as illustrated in FIG. 1A may be regarded as a "top-down" implementation, where the image illumination entering the main (second region) of the LOE enters from the top edge, whereas the orientation illustrated in FIG. 1B may be regarded as a "side-injection" implementation, where the axis referred to here as the Y axis is deployed horizontally. In the remaining drawings, the various features of certain embodiments of the present invention will be illustrated in the context of a "top-down" orientation, similar to FIG. 1A. However, it should be appreciated that all of those features are equally applicable to side-injection implementations, which also fall within the scope of the invention. In certain cases, other intermediate orientations are also applicable, and are included within the scope of the present invention except where explicitly excluded. The two-dimensional expansion embodiments illustrated here are merely exemplary, but the invention is also applicable to embodiments in which only a single dimension of aperture expansion is performed by the LOE.

It will be appreciated that the near-eye display 100 includes various additional components, typically including a controller 122 for actuating the image projector 114, typically employing electrical power from a small onboard battery (not shown) or some other suitable power source. It will be appreciated that controller 122 includes all necessary electronic components such as at least one processor or processing circuitry to drive the image projector.

An aspect of the present invention relates to an implementation of image projector 114 which includes an image conjugate generator arranged so that the image projector injects both the collimated image and its conjugate image into the LOE 10. Various non-limiting examples of the image conjugate generator will be illustrated herein below with reference to FIGS. 3-16. Thus, referring to FIG. 3, there is shown an enlarged schematic partial view of the optical system of FIG. 1 for directing an image towards a user for viewing. The optical system includes LOE 10 formed from transparent material and having first and second mutually-parallel major external surfaces 11a and 11b for supporting propagation of an image by internal reflection at those surfaces. LOE 10 also has a coupling-out arrangement (in region 118 of FIG. 1, as described above and not shown here) for coupling out the image towards an eye of the user, and a coupling-in aperture 15 which, in this case, is shows as a side edge of LOE 10.

Instead of relying upon structures integrated with the LOE 10 to generate the image-conjugate pair, an image projector 114 according to this aspect of the present invention includes an image conjugate generator to generate the image-conjugate pair prior to either the collimated image or the conjugate image impinging on either of the major external surfaces 11a and 11b of LOE 10.

Figure 3:
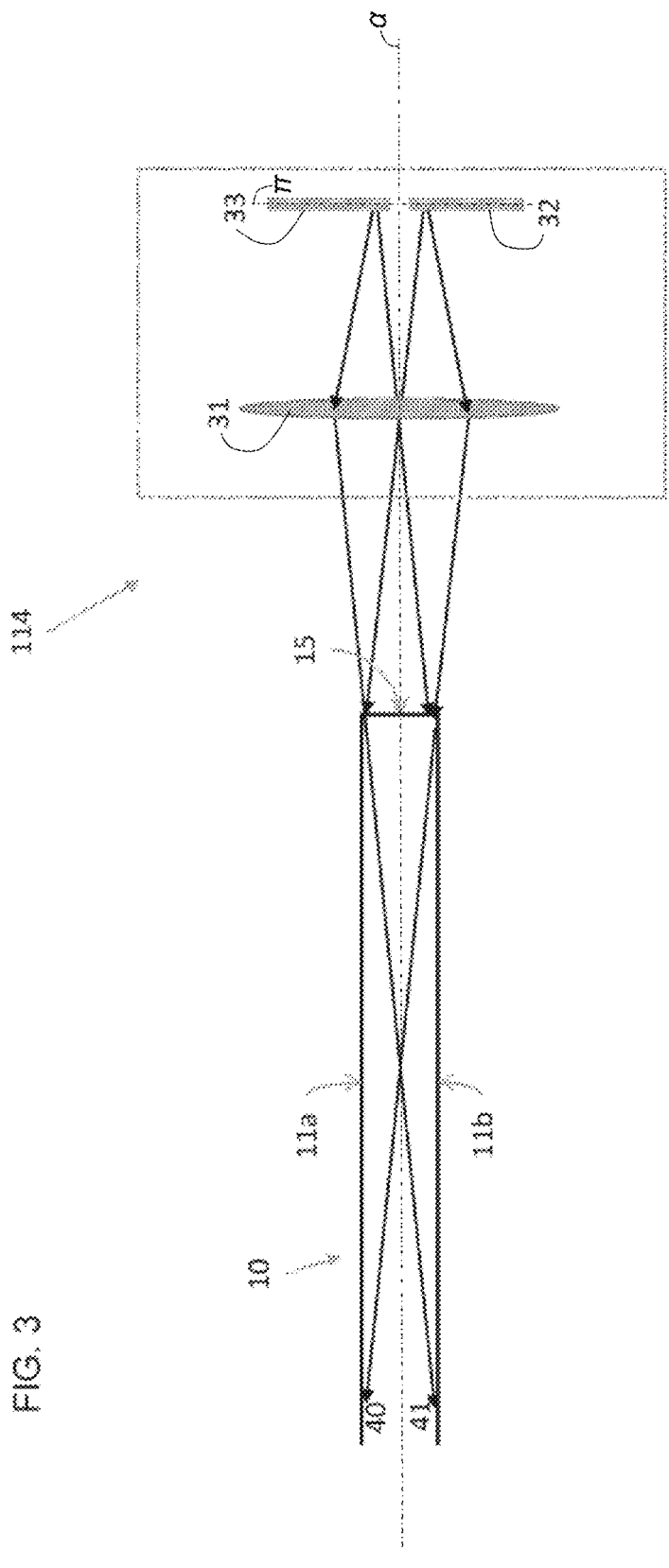
FIG. 3 is a schematic side view of a part of the optical system of FIGS. 1A and 1B illustrating coupling-in to the LOE of an image-conjugate image pair.

Thus, in the example of FIG. 3, image projector 114 includes an image generator 32 for generating an image, collimating optics 31 for collimating the image, and an image conjugate generator, here implemented as a second image generator 33 that generates the conjugate image. In the example illustrated here, image generators 32 and 33 share common collimating optics 31. Image projector 114 is coupled to coupling-in aperture 15 so as to introduce the collimated image and its conjugate image directly into LOE 10 prior to the collimated image or its conjugate image impinging on either of the major external surfaces 11a and 11b of LOE 10.

It will be appreciated that this solution contrasts clearly with the coupling-in arrangements of FIGS. 2A and 2B, where the conjugate image is generated within the LOE itself by reflections from the major external surfaces (or surfaces of a coupling prism which are a continuation of those surfaces and are defined for this purpose herein to be part of the major external surfaces of the LOE).

The two image generators 32 and 33 are driven to generate the same image with one inverted, and each field is identically shown from both fields. During assembly of the device, active alignment is preferably used, either by mechanical adjustment or more preferably by digital correction of the image display position, to move the two images on the image generators so that they are aligned as complementary conjugate images within the LOE. The LOE is thus "filled" with both the primary image and its conjugate from the coupling-in aperture onwards throughout the LOE, without requiring any extension of the LOE to achieve such filling.

Previous disclosures implemented an "image conjugate generator" as at least one reflective surface non-contiguous with the major external surfaces to generate the conjugate image. The term image generator in the context of the present disclosure instead means any type of micro-display image generator known in the art. Suitable examples include, but are not limited to, spatial light modulators (SLMs) including transmissive SLMs such as LCD displays and reflective SLMs such as LCOS displays, and active light-generating displays, such as OLED displays. Scanning image generators, in which a rapidly scanning laser beam is modulated synchronously with its scanning motion, may also be used as image generators according to the present invention. In such systems, the optical arrangement shown in FIG. 3 is arranged so that a single scanning mirror is located on the plane that is optically imaged to plane 15. The image plane may also include a micro-lens-array for beam expansion and/or image modulator (LCOS) for further image resolution enhancement. The present disclosure does not consider embodiments including only one image generator in conjunction with at least one reflective surface that reflects the image projected by the one image generator to produce the conjugate image to include an image conjugate generator. The present disclosure instead discloses various embodiments including (1) at least two image generators, (2) two images generated sequentially by the same generator, or (3) a single matrix that generates two images simultaneously.

For example, FIGS. 4A and 4B illustrate a one dimensional (i.e., one axis expansion) LOE 10 having only two reflecting surfaces 11a and 11b. The embodiment of FIG. 4A uses the reflective surface 29 (e.g., the bottom surface of the prism 14) to produce the conjugate image. An image generator generates a light beam that is virtually divided into two parallel beams. The first beam enters the LOE 10 via the aperture 15. The second light beam is reflected by the reflective surface 29 producing a conjugate light beam that enters the LOE 10 with the first light beam via the aperture 15. In effect, the reflective surface 29 produces two conjugate apertures 15a, 15b via which the first beam and conjugate beam, respectively, may enter the LOE 10. The first beam and the conjugate beam may then propagate in accurately opposing angles while being reflected by the surfaces 11a and 11b until facets reflect the beams out to the eye of the user. The embodiment of FIG. 4B, on the other hand, includes a second image generator 33 to generate the conjugate image. The image projector 114 includes an image generator 32 that generates a light beam and a second image generator 33 that generates a conjugate light beam. The first beam from the image generator 32 enters the LOE 10 via the aperture 15. The second, conjugate light beam from the conjugate generator 33 enters the LOE 10 with the first light beam via the aperture 15. The first beam and the conjugate beam may then propagate in accurately opposing angles while being reflected by the surfaces 11a and 11b until facets reflect the beams out to the eye of the user. This way, no reflector 29 is necessary, potentially reducing size and complexity of the optics. It is also possible to use a single image generating matrix 114 where 32 and 33 are images generated within this one matrix side by side. These images are generated as mirror images of each other (described schematically by the thick arrows).

In another example, FIGS. 5A and 5B illustrate a two dimensional LOE 10 (vortex light-guide optical element (VLOE) as disclosed in U.S. patent application Ser. No. 16/172,897, published as U.S. Pat. No. 10,564,417, having four reflecting surfaces 11a-11d. A VLOE is a multi-dimensional (i.e., multiple axis expansion) light-guide optical element.

The embodiment of FIG. 5A uses two reflective surfaces 27, 29 (e.g., two reflective surfaces of a prism) to produce conjugate images. An image generator generates a light beam that is virtually divided into four beams. The first beam enters the VLOE 10 via the aperture 15. The second light beam is reflected by the reflective surface 27 producing a conjugate light beam that enters the VLOE 10 with the first light beam via the aperture 15. The third light beam is reflected by the reflective surface 29 producing a conjugate light beam that enters the VLOE 10 with the first and second light beam via the aperture 15. The fourth light beam is reflected by both reflective surfaces 27, 29 producing a conjugate light beam that enters the VLOE 10 with the first, second, and third light beam via the aperture 15. In effect, the reflective surfaces 27, 29 produce four conjugate apertures 15a-15d via which the first beam and the conjugate beams may enter the VLOE 10. The four beams may then propagate in accurately opposing angles while being reflected by the surfaces 11a-11d until facets reflect the beams out of the VLOE 10. Here also, 114 can be a single matrix with 32 and 33 images within this matrix.

The embodiment of FIG. 5B, however, includes second, third, and fourth image generators 33, 34, 35 to generate conjugate images. The image projector 114 includes an image generator 32 that generates a light beam, a second image generator 33 that generates a conjugate light beam, a third image generator 34 that generates another conjugate light beam, and a fourth image generator 35 that generates yet another conjugate light beam. The first beam from the image generator 32 enters the VLOE 10 via the aperture 15. The conjugate light beams from the conjugate generators 33, 34, and 35 enter the VLOE 10 with the first light beam via the aperture 15. The first beam and the conjugate beams may then propagate in accurately opposing angles while being reflected by the surfaces 11a-11d until facets reflect the beams out of the VLOE 10. This way, no reflectors 27, 29 are necessary, potentially reducing size and complexity of the optics.

Therefore, again, the term image generator in the context of the present disclosure means any type of micro-display image generator known in the art. Although previous disclosures may have used at least one reflective surface non-contiguous with the major external surfaces to generate the conjugate image, the present disclosure instead discloses various embodiments including at least two image generators 32, 33 as defined herein, a first image generator to generate an image and at least one additional generator to generate a conjugate image. The accurate placement and magnification of the image and the conjugate image are to be calibrated electronically as the optical arrangement is tested. Therefore, there is no need for high accuracy of optical placement.

In one embodiment, the image generators 32, 33, etc. may project the image and the conjugate image(s) at different polarization (for example, by using different waveplates at every matrix), thereby generating a mix of polarizations in the LOE 10. Such a mix of polarizations in the LOE 10 may be used to promote depolarization to counter polarization that may be introduced by optical elements within the LOE 10. Depolarization may also be achieved by introducing at least one active or passive depolarizer in the optical system.

Such embodiments including at least two image generators 32, 33 may be further combined with reflecting surfaces. For example, FIG. 6 illustrates a hybrid embodiment using both a reflective surface 29 and a second image generator 33 to generate the conjugate images. FIG. 6 illustrates a two dimensional VLOE 10 having four reflecting surfaces 11a-11d. The projector 114 employs separate generators 32, 33 to generate a light beam and its conjugate light beam. The first beam and its conjugate 32, 33 enter the VLOE 10 via the aperture 15. The first beam and its conjugate light beam are reflected by the reflective surface 29 to produce conjugate light beams that enter the VLOE 10 via the aperture 15. In effect, the reflective surface 29 produces two apertures: aperture 15a via which the generated first beam and conjugate beam, respectively, may enter the VLOE 10 and aperture 15b via which the reflected conjugate beams may enter the VLOE 10. The first beam and the conjugate beams may then propagate in accurately opposing angles while being reflected by the surfaces 11a-11d until facets reflect the beams out the VLOE 10. Thus, image coupling into the VLOE 10 may be achieved by a hybrid combination of optical and digital image multiplication as shown in FIG. 6. The proper approach depends on the angle of images propagating in the LOE 10. In general, but not always, for steep angles, image optical (i.e., reflective) multiplication may be preferred, while for a shallow propagating image, a digital (i.e., second image generator) multiplication may be preferred.

Returning to FIG. 3 the two image generators 32, 33 illustrated project images from a direction directly in front of the LOE 10. That is, the two image generators 32, 33 are disposed symmetrical to each other in reference to a longitudinal center axis a of the LOE 10 and on a plane IT orthogonal to the major external surfaces 11a and 11b. However, this topology (projecting images from a direction directly in front of the LOE 10) may not be ideal for many near-eye display applications. The present disclosure instead discloses embodiments in which image generators are disposed such as to project images from directions not directly in front of the LOE 10. FIGS. 7-15 illustrate examples of such embodiments.

Figure 7:
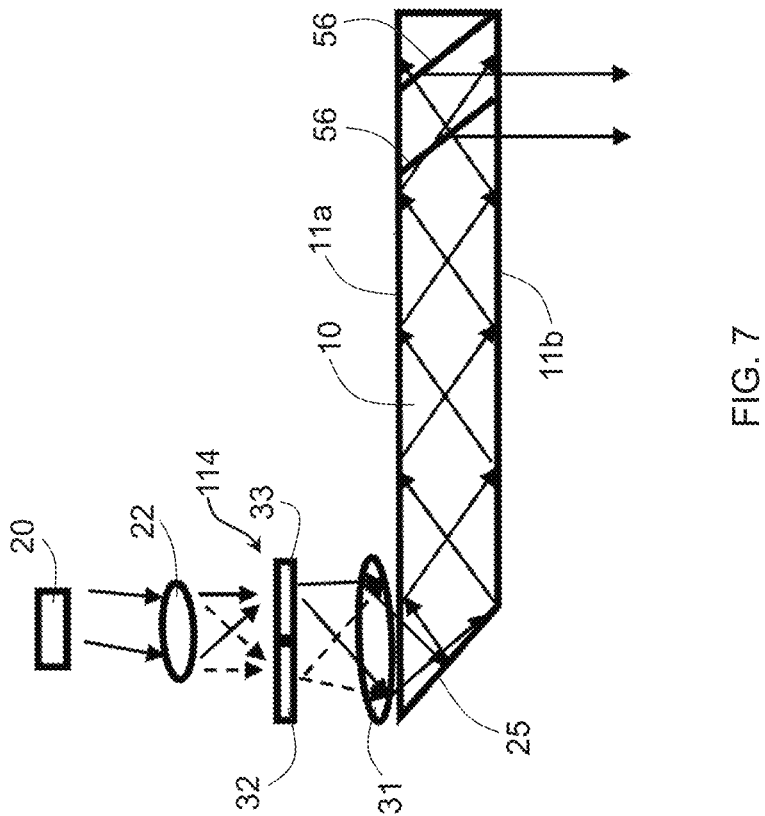
FIG. 7 illustrates an exemplary optical system including a reflective surface forming part of the LOE for serving as a coupling-in arrangement.

FIG. 7 illustrates an embodiment utilizing a reflecting surface 25 within the LOE 10 (i.e., side coupling) to couple-in the primary image and its conjugate image into the LOE 10. Light from a source 20 (e.g., laser scanner, LED, etc.) is collected by optics 22 (e.g., lens, light-pipe, etc.) to illuminate image generator 32 and conjugate image generator 33 (e.g., LCOS, DLP, etc.) In some embodiments, the image generators 32, 33 (e.g., LCOS, LCD, etc.) may generate their own illumination (e.g., OLED, micro-LED, etc.) without source 20 or optics 22. The generators 32, 33 may also correspond to a scanning mirror and micro lens array (MLA) in the case the source is a collimated laser. In the illustrated embodiment, light from the source generators 32, 33 is collimated by collimating optics 31 and injected into the LOE 10.

Thus, the example of FIG. 7 includes an image generator 32 for generating an image, an image conjugate generator 33 for generating a conjugate image, and collimating optics 31 for collimating the images. In the example illustrated here, image generators 32 and 33 share common collimating optics 31. Light from the image generators 32, 33 is coupled-in to the LOE 10 so as to introduce the collimated image and its conjugate image directly into LOE 10 prior to the collimated image and its conjugate image impinging on either of the major external surfaces 11a and 11b. The first beam and the conjugate beam may then propagate in opposing angles while being reflected by the surfaces 11*a*, 11*b* until facets 56 reflect the beams out of the LOE 10. The LOE 10 has built therein the reflecting surface 25 having dielectric or metallic coating. The entrance pupil in this configuration is defined by the reflecting surface 25. In this configuration, the spacing between optics 31 and the top surface 11*a* of LOE 10 is set to preserve reflectivity within the LOE 10. Reflectivity within the LOE 10 may be achieved by total internal reflection or coating. As may be readily appreciated from FIG. 7, the image generators 32, 33 are disposed such as to project images from a side direction, not from a direction directly in front of the LOE 10.

Figure 8:
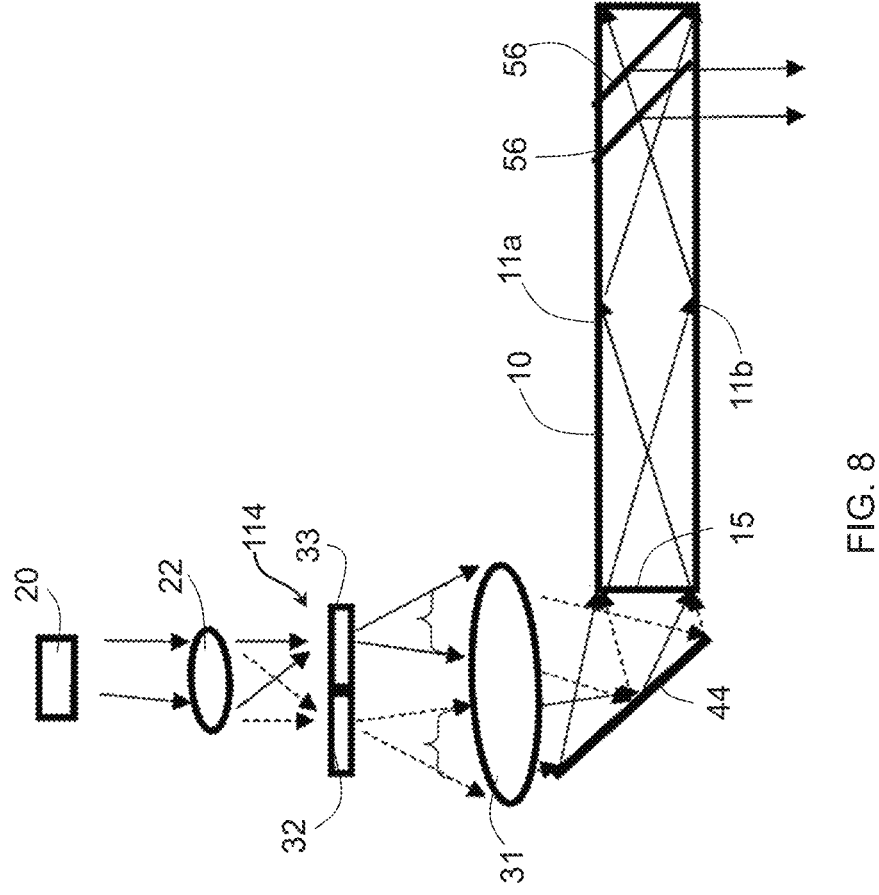
FIG. 8 illustrates an exemplary optical system including a reflective surface disposed adjacent the LOE for serving as a coupling-in arrangement.

FIG. 8 illustrates an implementation similar to that of FIG. 7 but utilizing a mirror 44 to couple-in the primary image and its conjugate image into the LOE 10. Light from the source 20 is collected by optics 22 to illuminate image generator 32 and conjugate image generator 33. In some embodiments, the image generators 32, 33 may generate their own illumination without source 20 or optics 22. Light from the source generators 32, 33 is collimated by collimating optics 31 and the mirror 44 reflects the light to be injected into the LOE 10 via the aperture 15. The mirror 44 is set to the proper angle so as to introduce the primary image and the conjugate image into LOE 10 prior to them impinging on either of the major external surfaces 11*a* and 11*b*. The collimated and conjugate beams may then propagate in opposing angles while being reflected by the surfaces 11*a*, 11*b* until facets 56 reflect the beams out of the LOE 10. As may be readily appreciated from FIG. 8, the image generators 32, 33 are disposed such as to project images from a side direction, not from a direction directly in front of the LOE 10.

Figure 9:
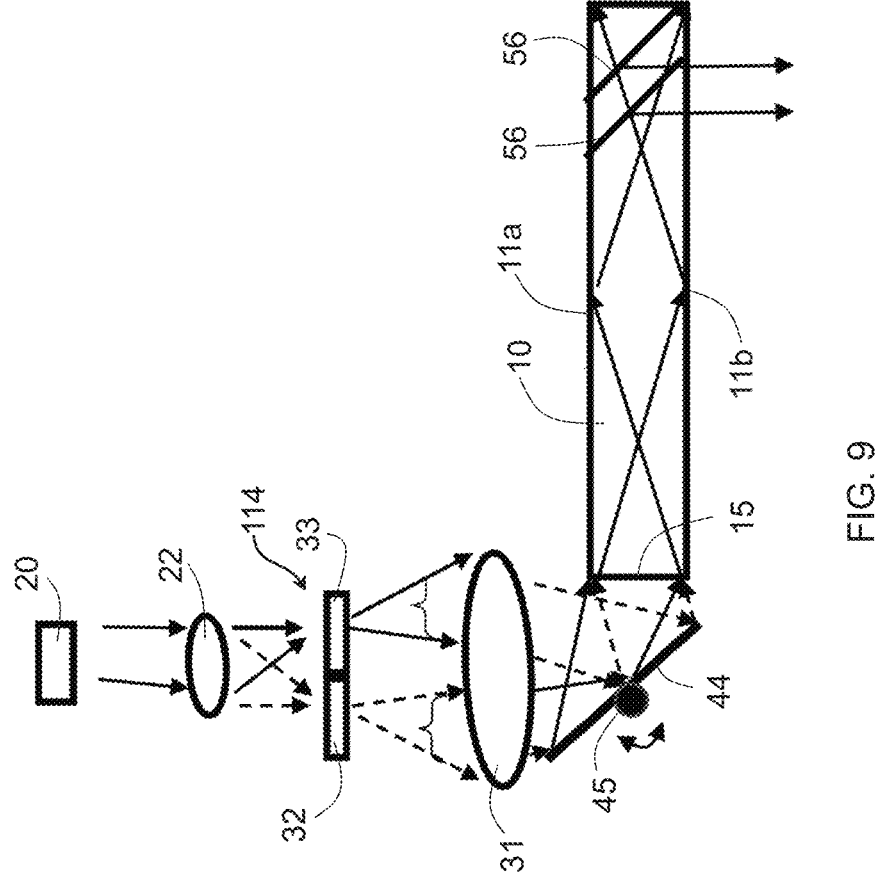
FIG. 9 illustrates an exemplary optical system including a reflective surface on a pivot for serving as a coupling-in arrangement that sequentially changes the coupled-in image.

FIG. 9 illustrates an implementation similar to that of FIGS. 7 and 8 but utilizing a tilting mirror 44 on a pivot 45. The mirror 44 may be made to pivot between two angles at a proper rate (e.g., 30 times per second, 60 times per second, 120 times per second, etc.) in concert with the image generators 32, 33, thereby enabling coupling-in of light beams from the image generators 32, 33 in sequence. This approach enables significant size reduction of the optics 31, having to transmit only one of the image or the conjugate image at any time.

The image generator 32 generates an image in concert with the pivoting mirror 44 set to the proper angle for insertion of the image via the aperture 15. Light from the image generator 32 is coupled-in to the LOE 10 so as to introduce the collimated image into LOE 10 prior to the collimated image impinging on either of the major external surfaces 11*a* and 11*b*. Thereafter, the pivoting mirror 44 is pivoted to the proper angle for insertion of the conjugate image via the aperture 15. The image generator 33 generates the conjugate image in concert with the pivoting mirror 44 set to the proper angle for insertion of the conjugate image via the aperture 15. Light from the image generator 33 is coupled-in to the LOE 10 so as to introduce the conjugate image into LOE 10 prior to the conjugate image impinging on either of the major external surfaces 11*a* and 11*b*. The collimated image and the conjugate beam may then propagate in opposing angles while being reflected by the surfaces 11*a*, 11*b* until facets 56 reflect the beams out of the LOE 10. Where the pivoting mirror 44 is pivoted at a high enough rate, the viewer would perceive the resulting image outputted by the facets 56 as similar to that outputted by the systems of FIGS. 7 and 8.

In an alternative embodiment, the illustrated concept may be used to produce four or more conjugate images to be injected into the LOE 10. The image generator 32 may generates an image in concert with the pivoting mirror 44 set to the proper angle for insertion of the image via the aperture 15. Light from the image generator 32 is coupled-in to the LOE 10 so as to introduce the collimated image into LOE 10 prior to the collimated image impinging on either of the major external surfaces 11*a* and 11*b*. Thereafter, the pivoting mirror 44 is pivoted to the proper angle for insertion of a first conjugate image via the aperture 15. The image generator 33 generates the first conjugate image in concert with the pivoting mirror 44 set to the proper angle for insertion of the first conjugate image via the aperture 15. Light from the image generator 33 is coupled-in to the LOE 10 so as to introduce the first conjugate image into LOE 10 prior to the first conjugate image impinging on either of the major external surfaces 11*a* and 11*b*. Thereafter, the pivoting mirror 44 is pivoted to the proper angle for insertion of a second conjugate image via the aperture 15. The image generator 32 generates the second conjugate image in concert with the pivoting mirror 44 set to the proper angle for insertion of the second conjugate image via the aperture 15. Light from the image generator 32 is coupled-in to the LOE 10 so as to introduce the second conjugate image into LOE 10 prior to the second conjugate image impinging on either of the major external surfaces 11*a* and 11*b*. Thereafter, the pivoting mirror 44 is pivoted to the proper angle for insertion of a third conjugate image via the aperture 15. The image generator 33 generates the third conjugate image in concert with the pivoting mirror 44 set to the proper angle for insertion of the third conjugate image via the aperture 15. Light from the image generator 33 is coupled-in to the LOE 10 so as to introduce the third conjugate image into LOE 10 prior to the third conjugate image impinging on either of the major external surfaces 11*a* and 11*b*. The collimated image and the conjugate images may then propagate along the LOE 10 (e.g., VLOE) until facets 56 reflect the beams out of the LOE 10.

As may be readily appreciated from FIG. 9, the image generators 32, 33 are disposed such as to project images from a side direction, not from a direction directly in front of the LOE 10. It may also be possible to use only one image generator 32 (no 33) and the scanning mirror flips between the two orientations while the image generator flips between the two mirror images.

Figure 10:
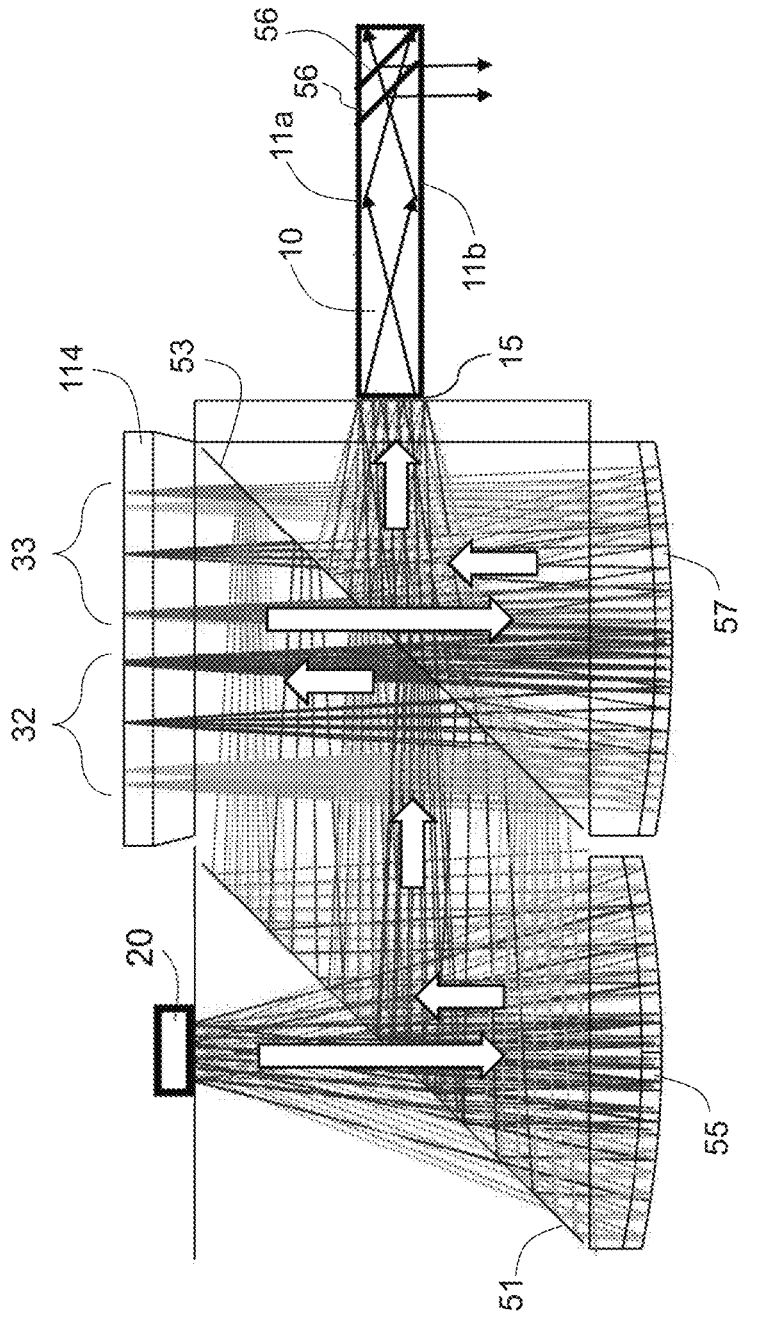
FIG. 10 illustrates an embodiment incorporating two polarizing beam splitters.

FIG. 10 illustrates an implementation utilizing polarizing beam splitters (PBS) (as disclosed in U.S. patent application Ser. No. 12/092,818, published as U.S. Pat. No. 9,551,880). In the embodiment of FIG. 10, two adjacent PBS 51, 53 are used. The first PBS 51 is disposed between the light source 20 (e.g., LED or scanning laser mirror), a refocusing reflective lens 55, and the image generating matrix 114. The second PBS 53 is disposed between the matrix 114 and a collimating reflective lens 57. Here, the matrix 114 generates multiple images (a primary image and one or more conjugate images), similar to the embodiment of FIG. 5B. In the view of FIG. 10, only two image generators 32, 33 may be seen, but additional image generators may be disposed along the axis into the page.

In practice, p-polarized light from the source 20 is transmitted through PBS 51 and impinges on the refocusing reflective lens 55, which reflect and converts the incoming beams. The reflected beams, now s-polarized, reflect off the PBS 51 and the PBS 53 to illuminate image generator matrix 32 and conjugate image generator matrix 33. In some embodiments, the image generator matrices 32, 33 may generate their own illumination without source 20. Light from the source generator matrices 32, 33, now p-polarized, is transmitted through the PBS 53 and is collimated by collimated and reflected by the collimating reflecting lens 57. Finally, the reflected beams, now s-polarized, reflect off the PBS 53 to enter the LOE 10 via the aperture 15. The collimated and conjugate beams may then propagate in opposing angles while being reflected by the surfaces along the LOE 10 until facets 56 reflect the beams out of the LOE 10. As may be readily appreciated from FIG. 10, the image generators 32, 33 are disposed such as to project images from a side direction, not from a direction directly in front of the LOE 10.

Figure 11:
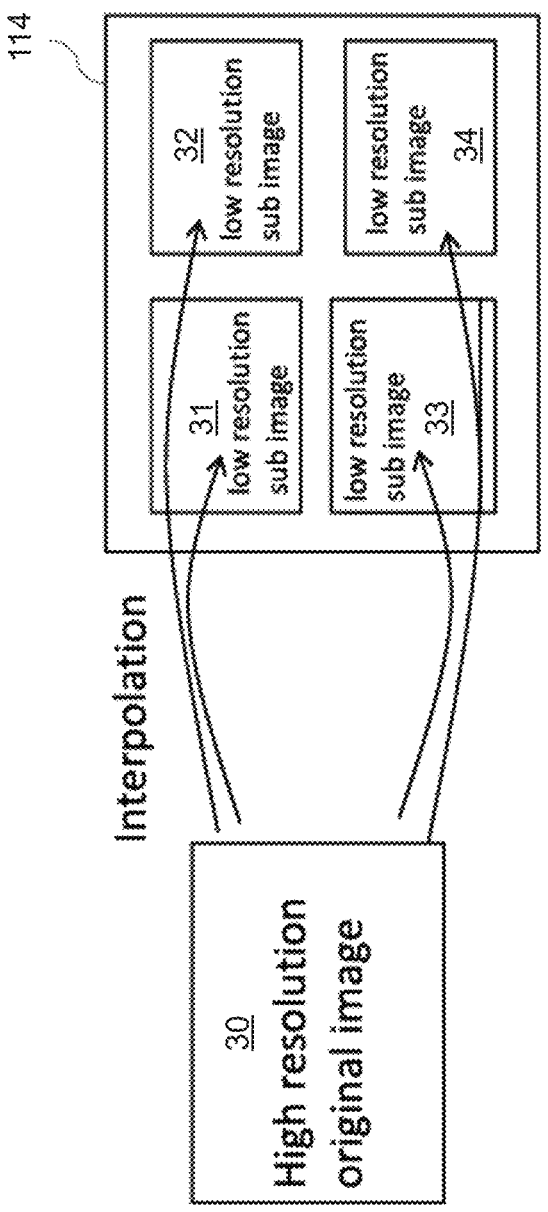
FIG. 11 illustrates a schematic diagram of a technique for super resolution or remedial resolution.

FIG. 11 illustrates a schematic description of an image processing flow to potentially be used with some of the embodiments disclosed herein, particularly embodiments utilizing two dimensional LOE 10 (VLOE). In order to minimize and/or offset any loss of resolution associated with the matrix 114 segmenting the high resolution original image 30 into sub-images 32, 33, 34, 35, etc., every sub-image may be interpolated directly from the original high resolution original image 30. There may be some overlap between sub-images 32, 33, 34, 35, etc., as they together represent the image 30. Consequently, subpixel resolution of the final image outputted by the facets 56 can be achieved as perceived by the observer when combining all beams projected to the eye. This is a form of super-resolution that, in this application, minimizes and/or offsets any loss of resolution associated with segmenting the high resolution original image 30 into sub-images 32, 33, 34, 35, etc.

Figures 12A, 12B, 12C:
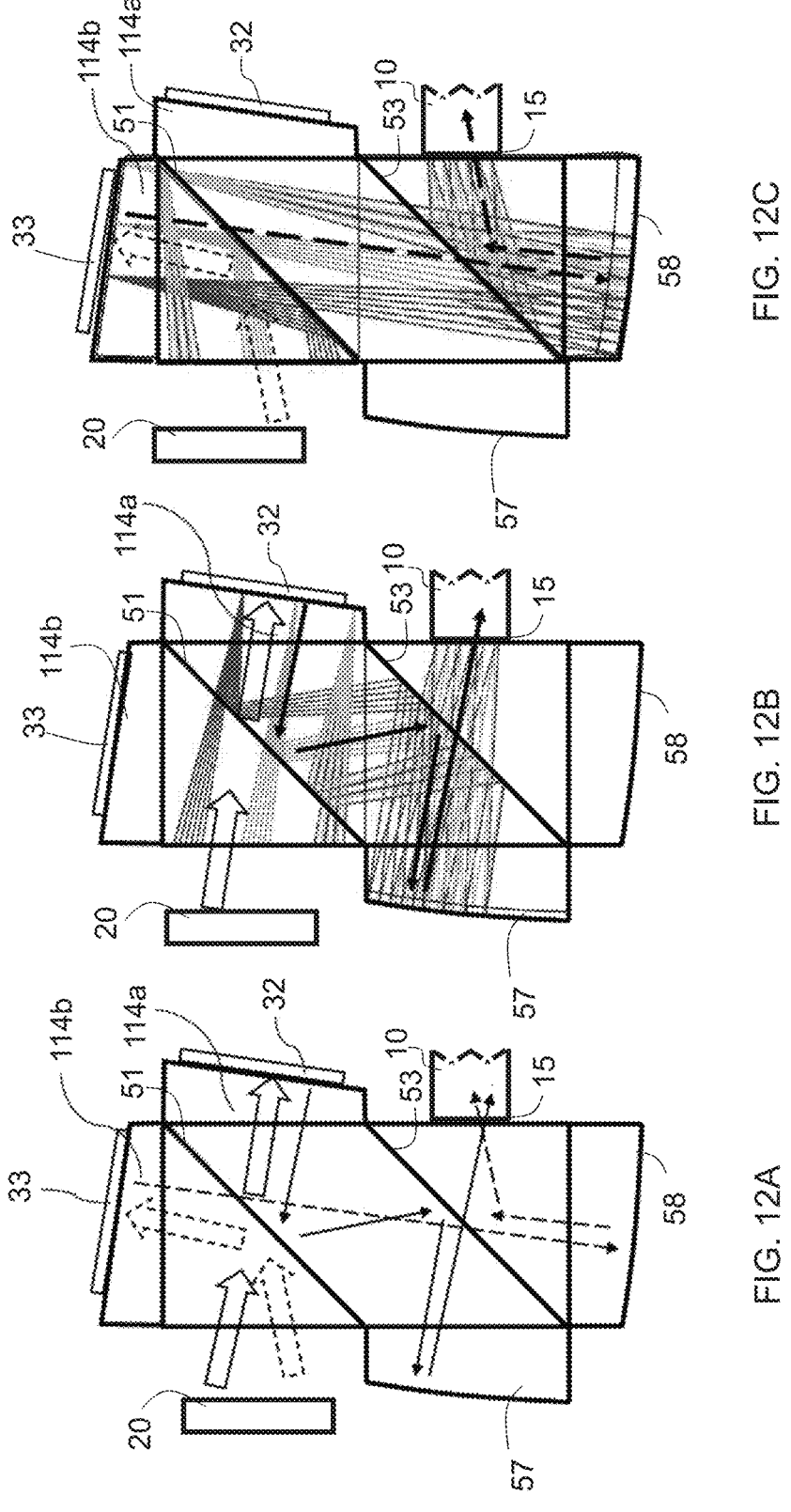
FIGS. 12A-C illustrate an embodiment where the image generators are not part of the same matrix but, instead, the matrix has been split into matrices.

FIGS. 12A-C illustrate another implementation of the techniques of the present invention. FIGS. 12A-C illustrate an embodiment where the image generators 32, 33 are not part of the same matrix 114 but, instead, the matrix 114 has been split into matrices 114a and 114b. The image generator 32 forms part of the first matrix 114a while the conjugate generator forms part of the second matrix 114b. The two matrices 114a, 114b are smaller than the single matrix 114 described in previous embodiments. This reduction in size and the flexibility of being able to locate the first and second matrices 114a, 114b independent of one another, create significant design advantages.

In FIGS. 12A-C, light corresponding to the first image generator 32 is shown in solid arrows while light corresponding to the conjugate image generator 33 is shown in dashed arrows. In the configuration of FIGS. 12A-C the optical prisms 114a and 114b and the LCOS matrices 32, 33 are tilted and so are the collimating reflecting lenses 57 and 58. This tilt enables the illustrated embodiment to contain all the beams in a small optical arrangement while retaining good quality since all beams interact almost perpendicularly with optics 57, 58 and prisms 114a, 114b. Two adjacent PBS 51, 53 are used. The first PBS 51 is disposed between the light source 20 (e.g., LED or scanning laser mirror) and the image generating prisms 114a, 114b. The second PBS 53 is disposed between the prisms 114a, 114b and the collimating reflective lenses 57, 58.

FIG. 12B illustrates a ray chart associated with the image generator 32, the chief image, while FIG. 12C illustrates a ray chart associated with the conjugate image generator 33, the conjugate image. In practice, p-polarized light from the source 20 is transmitted through PBS 51 to the matrix 114a to illuminate image generator 32. The image generated by the image generator 32 is s-polarized and, therefore, reflects off the PBS 51 and the PBS 53 to the collimating reflective lens 57. Collimated light reflected from the lens 57, now p-polarized, is transmitted through the PBS 53 to enter the LOE 10 (only a portion of the LOE 10 is shown) via the aperture 15. Simultaneously, s-polarized light from the source 20 is reflected off PBS 51 to the matrix 114b to illuminate conjugate image generator 33. The image generated by the conjugate image generator 33 is p-polarized and, therefore, is transmitted through the PBS 51 and the PBS 53 to the collimating reflective lens 58. Collimated light reflected from the lens 58, now s-polarized, is reflected off the PBS 53 to enter the LOE 10 via the aperture 15.

The collimated and conjugate beams may then propagate in opposing angles while being reflected by the surfaces along the LOE 10 until facets 56 reflect the beams out of the LOE 10. As may be readily appreciated from FIGS. 12A-C, the image generators 32, 33 are disposed such as to project images from a side direction, not from a direction directly in front of the LOE 10.

Figures 13A, 13B, 13C:
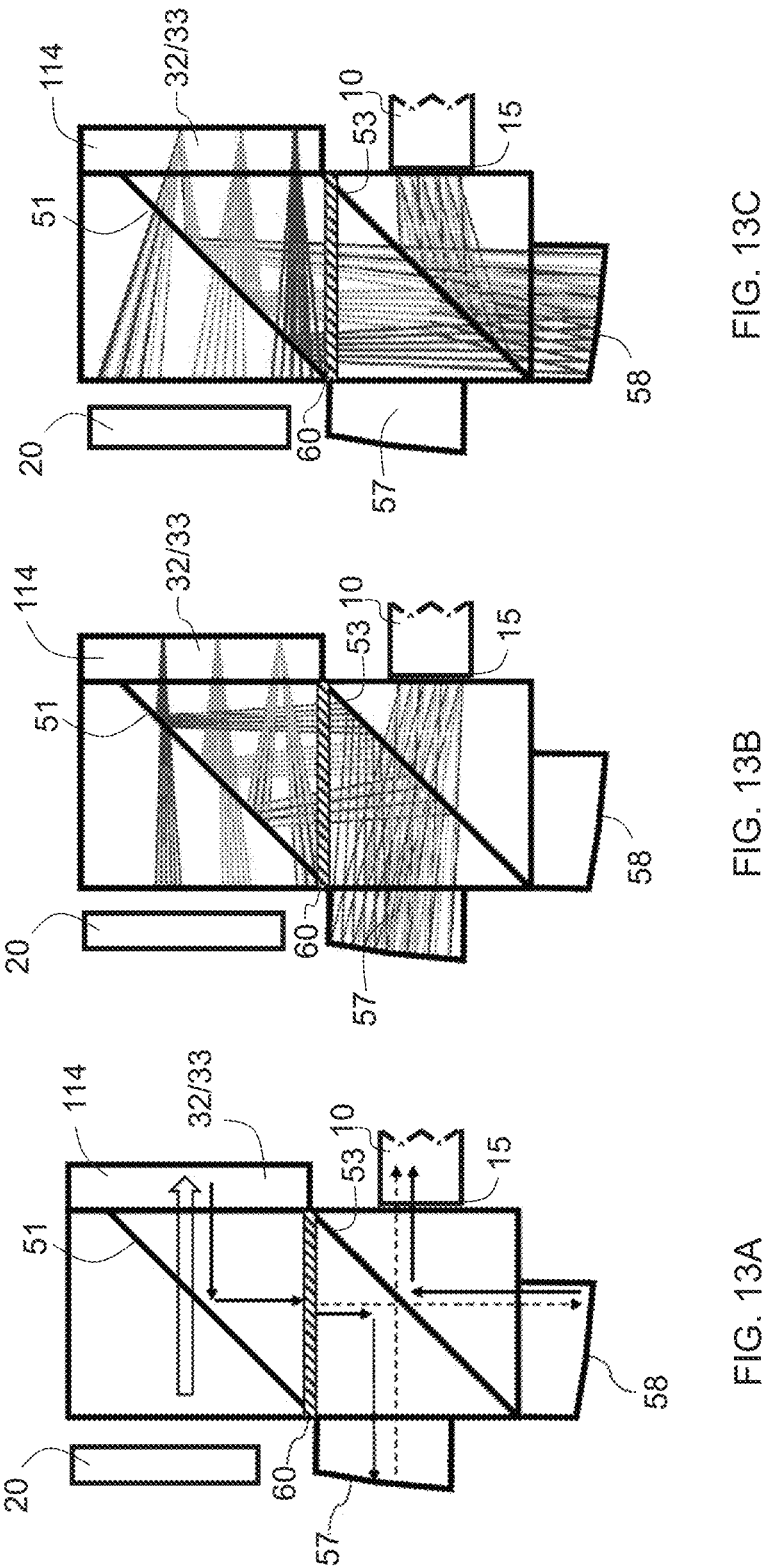
FIGS. 13A-C illustrate an embodiment where a single matrix 114 is multiplexed in time to generate the image and the conjugate image sequentially.

FIGS. 13A-C illustrate an embodiment of the present invention where a single matrix 114 is multiplexed in time to generate the image and the conjugate image sequentially. Two adjacent PBS 51, 53 are used. The first PBS 51 is disposed between the light source 20 (e.g., LED or scanning laser mirror) and the image generating matrix 114, and between the image generating matrix 114 and a liquid crystal switch 60. The second PBS 53 is disposed between the liquid crystal switch 60 and the collimating reflective lenses 57, 58. In the configuration of FIGS. 13A-C the collimating reflecting lenses 57 and 58 are tilted. This tilt enables the illustrated embodiment to contain all the beams in a small optical arrangement while retaining good quality since all beams interact almost perpendicularly with optics 57, 58 and matrix 114.

FIG. 13B illustrates a ray chart associated with the image generator 32/33 as it generates the chief image while FIG. 13C illustrates a ray chart associated with the image generator 32/33 as it generates the conjugate image.

To transmit the chief image (FIGS. 13A and 13B), p-polarized light from the source 20 (large arrow) is transmitted through PBS 51 to the matrix 114 to illuminate image generator 32. The chief image generated by the image generator 32 (solid arrow) is s-polarized and, therefore, reflects off the PBS 51 towards the switch 60. In the chief image case, the crystal switch 60 maintains polarization (s-polarized) and, therefore, light (solid arrow) reflects off the PBS 53 to the collimating reflective lens 57. Collimated light reflected from the lens 57, now p-polarized (cut arrow), is transmitted through the PBS 53 to enter the LOE 10 via the aperture 15. Thereafter, to transmit the conjugate image (FIGS. 13A and 13C), p-polarized light from the source 20 (large arrow) is transmitted through PBS 51 to the matrix 114 to illuminate image generator 33. The conjugate image generated by the image generator 33 (solid arrow) is s-polarized and, therefore, reflects off the PBS 51 towards the switch 60. In the conjugate case, the crystal switch 60 rotates polarization of the light (now p-polarized) and, therefore, light (cut arrow) transmits through the PBS 53 to the collimating reflective lens 58. Collimated light reflected from the lens 58, now s-polarized (solid arrow), reflects off the PBS 53 to enter the LOE 10 via the aperture 15. By fast switching between the two configurations (switch 60 and appropriate image on matrix 14) the illumination onto the LOE 10 will be perceived as if it is simultaneously the image and conjugate image.

The collimated and conjugate beams may then propagate in opposing angles while being reflected by the surfaces along the LOE 10 until facets 56 reflect the beams out of the LOE 10. As may be readily appreciated from FIGS. 13A-C, the image generator 32/33 is disposed such as to project images from a side direction, not from a direction directly in front of the LOE 10.

Figures 14A, 14B, 14C:
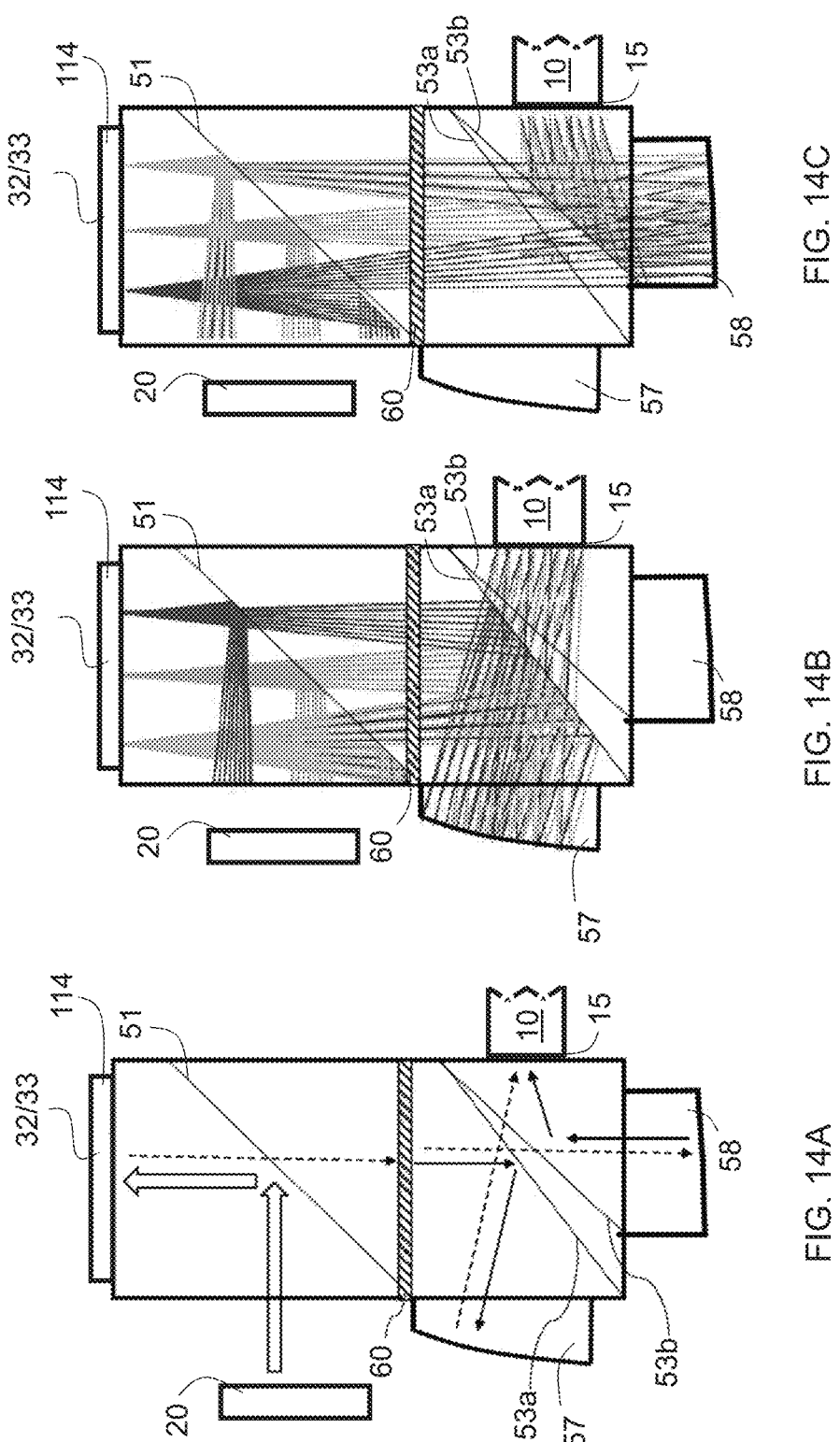
FIGS. 14A-C illustrate an embodiment equivalent to FIGS. 13A-C but where the PBS is split in two.

FIGS. 14A-C illustrate an embodiment equivalent to FIGS. 13A-C but here the PBS 53 is split in two 53*a* and 53*b*. Operation is identical to that of FIGS. 13A-C described above except that the chief image beam is reflected by 53*a* while the conjugate image beam is reflected by 53*b*. Consequently, illumination on the matrix 114 for both alternatives is overlapping. According to this embodiment, it is possible to implement the split PBS 53*a*, 53*b* onto the two-matrix configuration 114*a* and 114*b* (see FIGS. 12A-C) thereby achieving the same illumination orientation for the chief image and the conjugate images, thereby improving illumination coupling efficiency.

As may be readily appreciated from FIGS. 14A-C, the image generator 32/33 is disposed such as to project images from a side direction, not from a direction directly in front of the LOE 10.

In all the above embodiments, other types of matrices may be used that do not need PBS, such as for example LCD (direct through optical path) or DLP (non-PBS prism).

Figure 15:
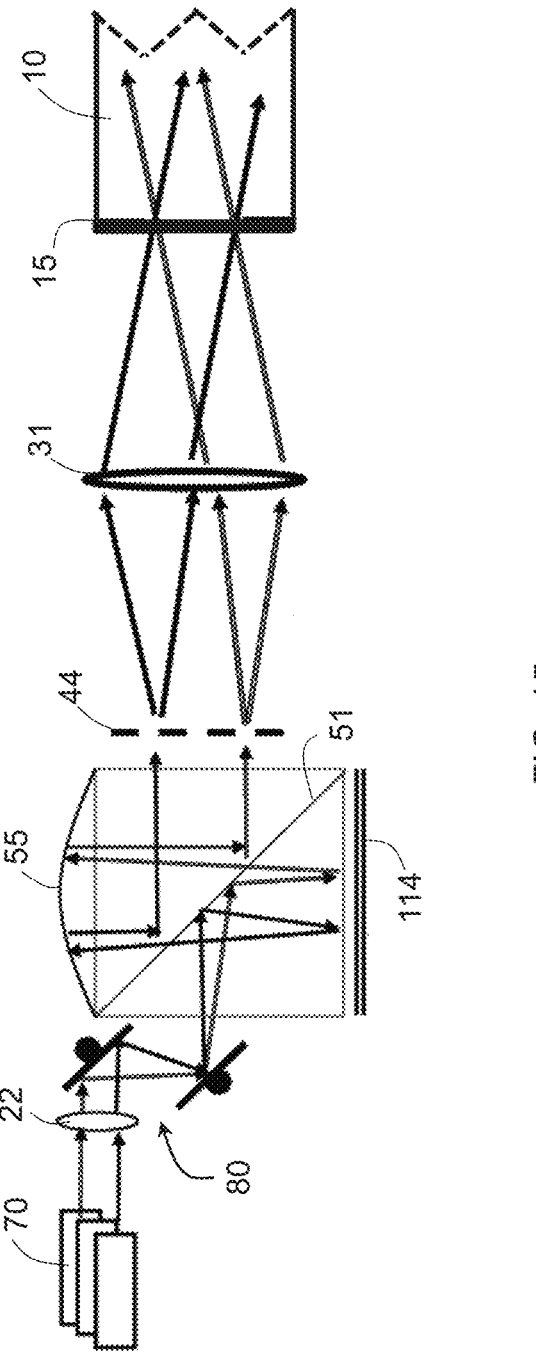
FIG. 15 illustrates an embodiment utilizing a scanning laser over an LCOS matrix.

FIG. 15 illustrates an embodiment utilizing a scanning laser 10 over an LCOS matrix 114. Such a configuration can achieve high light coupling efficiency with high resolution (characterized by the large pixel count of the LCOS 114). In the illustrated embodiment only the chief image rays are shown for clarity. Two beams are generated by two lasers 70. The beams are focused by lens 22 through mirror scanner 80 and reflected by PBS 51 onto matrix 114. The two beams generate two images on the matrix 114 while the matrix 114 is modulated to further improve image resolution. The two beams transmit through PBS 51, are refocused by reflective lens 55, and reflected by PBS 51 onto diffuser or micro-lens-array (MLA) 44. The MLA 44 increases the divergence of every beam so that the beams fill the aperture 15 of LOE 10. Collimating optics 31 collimates the beams prior to injection into the LOE 10.

Using two beams to generate the chief image and the conjugate image as shown has substantial benefits: 1) Scanning speed is increased so minimal flickering perception is visible, and 2) The use of two beams reduces actual aperture size thereby reduces the need for wide diverging MLA 44. In extreme cases (small aperture 15 or large initial beams), no MLA 44 may be needed.

The configuration of FIG. 15 may be used when illuminating the LCOS 114 with LED. Furthermore, this configuration may be used with sequential single image generation as described above.

Figures 16A, 16B, 16C:
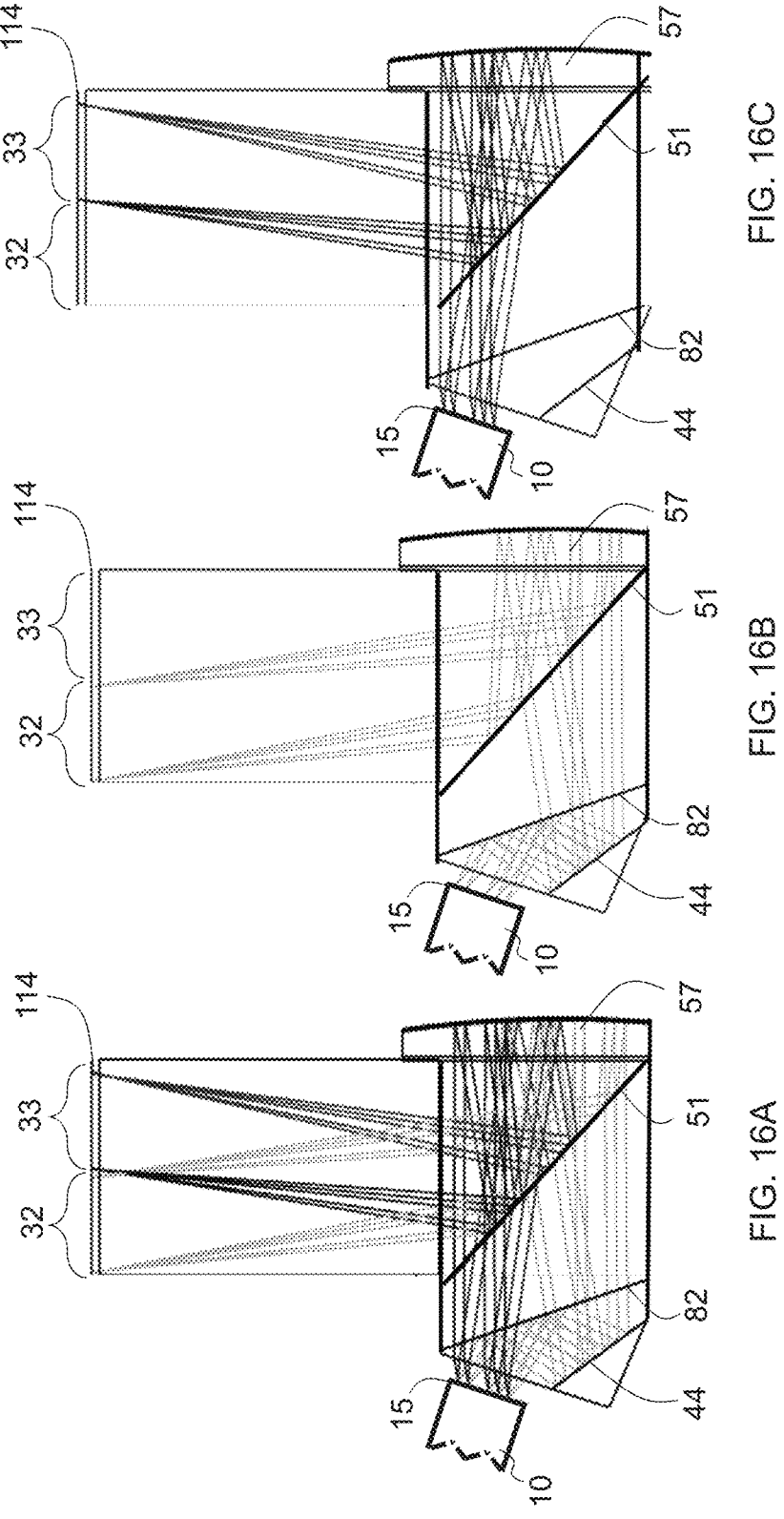
FIGS. 16A-C illustrate an embodiment where the image and its conjugate are angularly separated one from the other and includes an angularly selective mirror disposed in front of the aperture.

Another solution for systems where the image and its conjugate are angularly separated one from the other is shown in FIGS. 16A-C. FIG. 16A illustrates a ray chart including both the chief image and the conjugate image. FIGS. 16B and 16C illustrate ray charts independently showing the chief image and the conjugate image, respectively. The system of FIGS. 16A-C includes an angularly selective mirror 82 disposed in front of the aperture 15. The mirror 82 may have a coating designed so that it will reflect beams of images propagating at certain angles (e.g., shallow angles) while being transparent for beams propagating at other angles (e.g., steep angles). Such a coating was designed and shown in International Application No. PCT/IL2004/000813, published as WO2005/024491 and International Application No. PCT/IL2015/051222, published as WO2016/103251.

In operation, the image generator 32 (e.g., SLM) generates the chief image (FIG. 16B). The s-polarized image is reflected off the PBS 51 to the collimating reflective lens 57. Collimated light reflected from the lens 57, now p-polarized, is transmitted through the PBS 51 through the angularly selective mirror 82 (because the angle is very steep, almost perpendicular) and to the mirror 44, which reflects the light back towards the angularly selective mirror 82. This time, light reaches the angularly selective mirror 82 at a shallow angle and, therefore, it is reflected towards the aperture 15. Simultaneously, the image generator 33 (e.g., SLM) generates the conjugate image (FIG. 16C). The s-polarized image is reflected off the PBS 51 to the collimating reflective lens 57. Collimated light reflected from the lens 57, now p-polarized, is transmitted through the PBS 51 through the angularly selective mirror 82 (because the angle is very steep, almost perpendicular) to the aperture 15. Simultaneously, the image generator 33 generates the conjugate image (FIG. 16C). Thus, on the LCOS 114 the two images will occupy close sections and the total area of the LCOS 114 could be reduced.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. An optical system for directing an image towards a user for viewing, the optical system comprising:

(a) a light-guide optical element (LOE) formed from transparent material and having at least first and second mutually-parallel major external surfaces for supporting propagation of an image by internal reflection at the first and second major external surfaces, the LOE having a coupling-out arrangement for coupling out the image towards an eye of the user, the LOE having a coupling-in aperture; and (b) an image projector separate from the LOE, the image projector comprising:

a first micro-display image generator for generating an image, and a second micro-display image conjugate generator for generating a conjugate image of the image;

wherein said image projector being disposed relative to said coupling-in aperture so as to project said image generated by the first micro-display image generator and said conjugate image generated by the second micro-display image conjugate generator from the projector and introduce into said coupling-in aperture said image and said conjugate image prior to said image and said conjugate image impinging on either of said at least first and second major external surfaces, and wherein after reflection of the image from one of the at least first and second mutually-parallel major external surfaces, the reflected image angularly overlaps the conjugate image, and after reflection of the conjugate image from an opposite one of the at least first and second mutually-parallel major external surfaces, the reflected conjugate image angularly overlaps the image.

2. The optical system of claim 1, wherein the at least one of the first micro-display image generator or the second micro-display image conjugate generator comprises at least one of a spatial light modulator (SLM), an active light-generating display, or a scanning image generator.

3. The optical system of claim 1, comprising:

third and fourth mutually-parallel major external surfaces perpendicular to the at least first and second mutually-parallel major external surfaces resulting in the LOE having a rectangular cross-section;

a reflector that extends from the coupling-in aperture parallel to at least one of the first, second, third, and fourth major external surfaces, wherein at least a portion of light corresponding to the image and at least a portion of light corresponding to the conjugate image reflect from the reflector before entering the LOE through the coupling-in aperture, thereby generating two additional conjugate images that, together with the image and the conjugate image, propagate in four fold within the LOE.

4. The optical system of claim 1, comprising:

third and fourth mutually-parallel major external surfaces perpendicular to the at least first and second mutually-parallel major external surfaces resulting in the LOE having a rectangular cross-section;

third and fourth micro-display image conjugate generators for respectively generating additional conjugate images of the image, resulting in four images that propagate in four fold within the LOE, wherein each of the four images angularly overlaps at least one other four images during the four fold propagation.

5. The optical system of claim 1, wherein the first micro-display image generator is operable to produce said image at a first polarization and the second micro-display image conjugate generator is operable to produce said conjugate image a second polarization, said second polarization different from said first polarization.

6. The optical system of claim 1, further comprising at least one collimating reflecting lens disposed between said first micro-display image generator and said second micro-display image conjugate generator and said coupling-in aperture.

7. The optical system of claim 6, wherein said first micro-display image generator and said second micro-display image conjugate generator share a common collimating reflecting lens.

8. The optical system of claim 1, further comprising a coupling-in reflective surface deployed within the LOE obliquely to the first and second major external surfaces, wherein said image generated by the first micro-display image generator and said conjugate image generated by the second micro-display image conjugate generator couple into the LOE from a side of the first major external surface or a side of the second major external surface.

9. The optical system of claim 8, further comprising at least one collimating reflecting lens disposed between said first micro-display image generator and said second micro-display image conjugate generator and said side of the first major external surface or said side of the second major external surface.

10. The optical system of claim 9, wherein said first micro-display image generator and said second micro-display image conjugate generator share a common collimating reflecting lens.

11. An optical system for directing an image towards a user for viewing, the optical system comprising:

(a) a light-guide optical element (LOE) formed from transparent material and having at least first and second mutually-parallel major external surfaces for supporting propagation of an image by internal reflection at the first and second major external surfaces, the LOE having a coupling-out arrangement for coupling out the image towards an eye of the user, the LOE having a coupling-in aperture; and (b) an image projector separate from the LOE, the image projector comprising:

a first micro-display image generator for generating an image, and a second micro-display image conjugate generator for generating a conjugate image of the image;

wherein said image projector being disposed relative to said coupling-in aperture so as to project said image generated by the first micro-display image generator and said conjugate image generated by the second micro-display image conjugate generator from the projector and introduce into said coupling-in aperture said image and said conjugate image prior to said image and said conjugate image impinging on either of said at least first and second major external surfaces, and wherein the LOE further comprises a coupling-in reflective surface proximal to the coupling-in aperture deployed within the LOE obliquely to the first and second major external surfaces, wherein said image generated by the first micro-display image generator and said conjugate image generated by the second micro-display image conjugate generator couple into the LOE from a side of the first major external surface or a side of the second major external surface.

12. The optical system of claim 11, further comprising at least one collimating reflecting lens disposed between said first micro-display image generator and said second micro-display image conjugate generator and said side of the first major external surface or said side of the second major external surface.

13. The optical system of claim 12, wherein said first micro-display image generator and said second micro-display image conjugate generator share a common collimating reflecting lens.

14. The optical system of claim 11, wherein the at least one of the first micro-display image generator or the second micro-display image conjugate generator comprises at least one of a spatial light modulator (SLM), an active light-generating display, or a scanning image generator.

* * * * *